(12) United States Patent
Forohar et al.

(10) Patent No.: US 7,833,366 B1
(45) Date of Patent: Nov. 16, 2010

(54) METHOD FOR MAKING SINGLE WALLED CARBON NANOTUBES BY ACTIVATION WITH HYDRAZOIC ACID

(75) Inventors: Farhad Forohar, La Plata, MD (US); Magdy Bichay, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 222 days.

(21) Appl. No.: 11/998,982

(22) Filed: Oct. 31, 2007

(51) Int. Cl.
*C06B 45/00* (2006.01)
*C06B 45/04* (2006.01)
*C06B 35/00* (2006.01)
*D03D 23/00* (2006.01)
*D03D 43/00* (2006.01)

(52) U.S. Cl. .......................... 149/109.6; 149/2; 149/17; 149/35; 149/109.4

(58) Field of Classification Search ................. 558/300; 149/109.6, 2, 17, 35, 109.4
See application file for complete search history.

(56) References Cited

U.S. PATENT DOCUMENTS

| 4,759,179 | A | * | 7/1988 | Benard et al. ................. 60/218 |
| 2002/0092984 | A1 | * | 7/2002 | Colbert et al. ............. 250/306 |
| 2004/0040637 | A1 | | 3/2004 | Desilets et al. |
| 2007/0039671 | A1 | | 2/2007 | Desilets et al. |

OTHER PUBLICATIONS

U.S. Appl. No. 11/981,242, filed Oct. 31, 2007, Forohar et al.

* cited by examiner

*Primary Examiner*—Jerry Lorengo
*Assistant Examiner*—James E McDonough
(74) *Attorney, Agent, or Firm*—Fredric J. Zimmerman

(57) ABSTRACT

The present invention relates generally to methods of making carbon nanotubes, and more particularly to the interaction of single wall carbon nanotubes with hydrazoic acid to introduce energetic azide groups into the nanotubes to form activated carbon nanotubes.

4 Claims, 7 Drawing Sheets

METHOD FOR MAKING SINGLE WALLED CARBON NANOTUBES BY ACTIVATION WITH HYDRAZOIC ACID

FIELD OF THE INVENTION

The present invention relates generally to methods of making carbon nanotubes, and more particularly to the interaction of single wall carbon nanotubes with hydrazoic acid to introduce energetic azide groups into the nanotubes to form activated carbon nanotubes.

BACKGROUND OF THE INVENTION

Carbon nanotubes have been the subject of intense studies for over a decade now. Carbon nanotubes can be single-walled or multi-walled. Single-walled carbon nanotubes (SWNTs) can be viewed as sheets of graphene rolled into cylinders with diameters of about 1-10 nm and lengths of about 100-500 nm (Dai, H., *Acc. Chem. Res.*, 35:1035-1044 (2002)). Gases such as $NH_3$, $H_2$, $NO_2$, $SO_2$, $CO_2$, $F_2$, $CF_4$, and $O_3$ have already been studied for functionalization and/or encapsulation into the SWNTs (Ellison, M. D. et al., *J. Phys. Chem. B*, 108:7938-7943 (2004); Pekker, S. et al., *J. Phys. Chem. B*, 105:7938-7943 (2001); Feng, X. et al., *J. Am. Che. Soc.*, 127:10533-10538 (2005); Zhao, X. B. et al., *J. Phys. Chem. B*, 109:8880-8888 (2005); Yim, W. L. et al., *J. Phys. Chem. B*, 107:9363-9369 (2003); Long, R. Q. et al., *Ind. Eng. Chem. Res.*, 40:4288-4291 (2001); Mercuri, F. et al., *J. Phys. Chem. B*, 109:13175-13179 (2005); Mickelson, E. T. et al., *Chem. Phys. Lett.*, 296:188-194 (1998); Byl, O. et al., *J. Am. Chem. Soc.*, 125:5889-5896 (2003); Cai, L. et al., *Chem. Mater.*, 14:4235-4241 (2002); Banerjee, S. et al., *J. Phys. Chem. B*, 106:12144-12151 (2002)). Most of these studies are conducted at low temperatures due to the weakness of the interactions between the SWNTs and the gases. However, it has been reported that $NH_3$ and $NO_2$ react with SWNTs at room temperature entering into the grooves and interacting with multiple nanotubes, the products of which display significant change in conductivity (Ellison, M. D. et al., *J. Phys. Chem. B*, 108:7938-7943 (2004)).

One study describes the reaction of $HN_3$ with diamond and hydrogenated diamond surfaces at low temperatures (Thorns, B. et al., Surface Science, 337:L807-L811 (1995)). Accordingly, $HN_3$ may be a suitable reagent for incorporation of the energetic azide moiety into host carbon based molecules.

The present invention relates to the interaction of SWNTs with hydrazoic acid ($HN_3$) as a method to form SWNTs with energetic groups incorporated therein.

SUMMARY OF THE INVENTION

The present invention relates generally to methods of making carbon nanotubes, and more particularly to the interaction of single wall carbon nanotubes with hydrazoic acid to introduce energetic azide groups into the nanotubes to form activated carbon nanotubes.

More particularly, the present invention relates to a method of making an activated single walled carbon nanotube (SWNT) having a tubular single wall and a plurality of metal azides inside the wall, comprising the steps of: a) providing the SWNTs, wherein the SWNTs further comprise at least one metal catalyst inside the wall; and b) reacting the SWNTs with hydrazoic acid to form metal azides inside the wall. The metal may be, for example, iron, lead, nickel, copper and silver.

In addition, the hydrazoic acid used in the practice of the present invention may be in either gaseous or liquid. Additionally, the hydrazoic acid may be formed by heating a mixture of sodium azide with excess stearic acid.

The SWNTs can be exposed to the hydrazoic acid in any form, such as on glass wool, in polytetrafluoroethylene (PTFE) tubing, or in a liquid suspension.

Other aspects of the present invention are found throughout the specification.

DETAILED DESCRIPTION OF THE INVENTION

Figure 1:
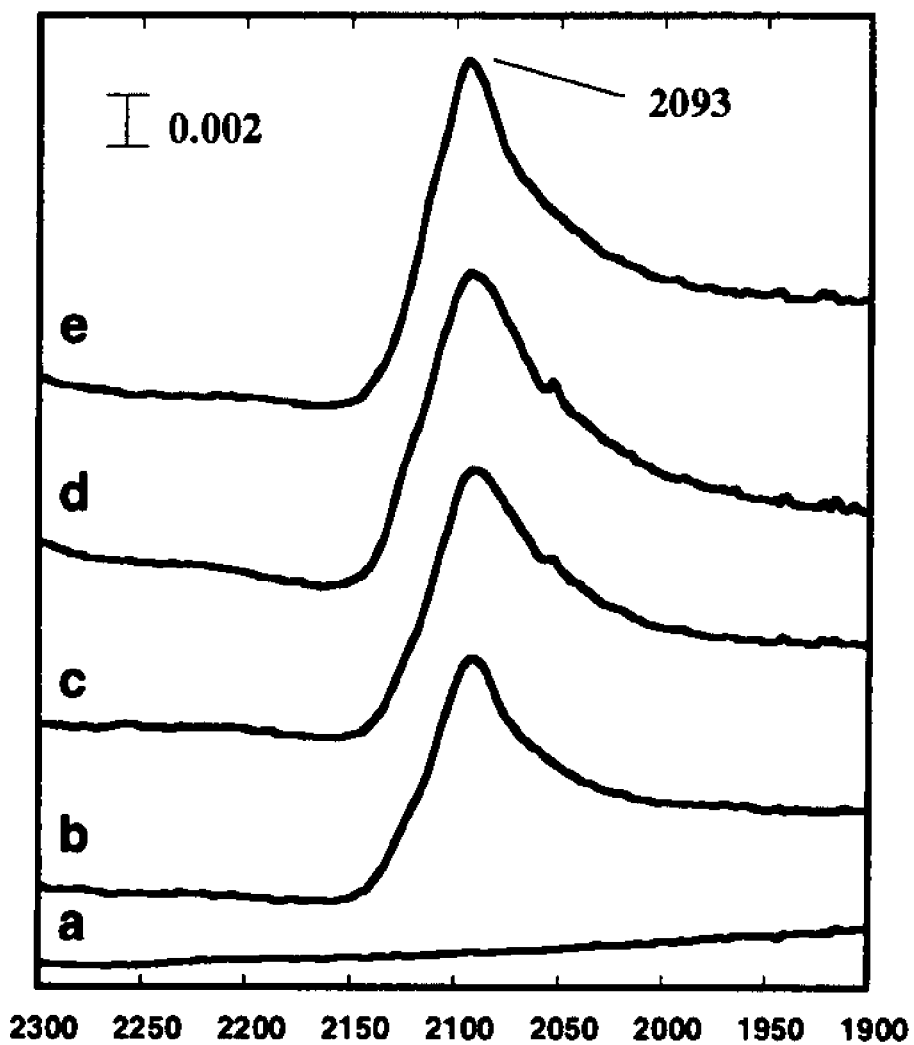
FIG. 1 shows IR absorption spectra of Carbolex SWNTs obtained during incremental $HN_3$ exposures: a) untreated SWNT; b) 1 exposure; c) 2 exposures; d) 3 exposures; and e) 4 exposures.

The present invention relates generally to carbon nanotubes, and more particularly to the interaction of single wall carbon nanotubes with hydrazoic acid.

It was of interest to determine if $HN_3$ reacts with the defect sites of SWNTs to generate $C-N_3$ bonds, or if it penetrates and becomes trapped inside the nanotube or at the interfacial layers between strands of carbon nanotubes.

Preparation of Hydrazoic Acid

Hydrazoic acid is a very energetic and sensitive compound that can decompose explosively. Accordingly, it must be handled with extreme care, such as behind an explosion proof shield in a well-ventilated hood. For use in the practice of the present invention hydrazoic acid ($HN_3$) can be generated as a gas or in solution with water, toluene, ether, etc. Myers, J. K. et al., *J. Am. Chem. Soc.*, 121:8959-8960 (1999); Muller, J. et al., *Heteroatom Chemistry*, 1:461-465 (1990); Breton, G. W. et al., *J. Org. Chem.*, 57:6646-6649 (1992); Fraenk, W. et al., *Inorg. Chem.*, 40:1334-1340 (2001). The safer and simpler way to generate gaseous hydrazoic acid is by heating a mixture of sodium azide with excess stearic acid at above 80° C. McDonald, J. R. et al., *J. Chem. Phys.*, 52:1332 (1970).

Carbon Nanotubes

Carbon nanotubes ("CNT") are macromolecules in the shape of a long thin cylinder often with a diameter in few nanometers. The basic structural element in a carbon nanotube is a hexagon which is the same as that found in graphite. Based on the orientation of the tube axis with respect to the hexagonal lattice, a carbon nanotube can have three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice. Nanotubes of these configurations often exhibit different physical and chemical properties. For example, an armchair nanotube is always metallic, whereas a zigzag nanotube can be metallic or semiconductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of a carbon nanotube molecule can also contain other size rings, such as pentagon and heptagon. Replacement of some regular hexagons with pentagons and/or heptagons can cause cylinders to bend, twist, or change diameter, and thus lead to some interesting structures such as "Y-", "T-", and "X-junctions". Those various structural variations and configurations can be found in both SWNT and MWNT (Multi-walled carbon nanotube). However, the present invention is not limited by any particular configuration and structural variation. The carbon nanotube used in the present invention can be in the configuration of armchair, zigzag, chiral, or combinations thereof. The nanotube can also contain structural elements other than hexagon, such as pentagon, heptagon, octagon, or combinations thereof. The structural element other than hexagon on the sidewall of the nanotube is often referred as a defect site, which exhibits different chemical reactivity than the normal hexagonal structural element. In general, the defect site is more active chemically and more susceptible to chemical modifications.

Another structural variation for MWNT molecules is the arrangement of the multiple tubes. A perfect MWNT is like a stack of graphene sheets rolled up into concentric cylinders with each wall parallel to the central axis. However, the tubes can also be arranged so that an angle between the graphite basal planes and the tube axis is formed. Such MWNTs may be known as a stacked cone, Chevron, bamboo, ice cream cone, or piled cone structures. A stacked cone MWNT can reach a diameter of about 100 nm.

Carbon nanotubes used in the present invention can also be chemically modified and functionalized. Covalent functionalization of carbon nanotubes has commonly been accomplished by three different approaches, namely, thermally activated chemistry, electrochemical modification, and photochemical functionalization. The most common methods of thermally activated chemical functionalization are oxidation reactions. For example, the extensive treatment of a nanotube with concentrated nitric and sulfuric acids leads to the oxidative opening of the tube caps (the ends) as well as the formation of holes in the sidewalls at the defeat sites and thus produces a nanotube decorated with carboxyl groups, which can be further modified through the creation of amide and ester bonds to generate a vast variety of functional groups. The nanotube molecule can also be modified through addition reactions with various chemical reagents such halogens and radicals.

The term "carbon nanotube" used in the present invention covers all structural variations and modification of SWNT and MWNT discussed herein, including configurations, structural defects and variations, tube arrangements, chemical modification and functionalization, and encapsulation.

In general, a carbon nanotube has two structurally distinct regions, the end caps and the sidewall, with different chemical reactivity. The end cap of a carbon nanotube structurally resembles a hemispherical fullerence, having similar reactivity of a fullerence. However, the curvature in the sidewall of a carbon nanotube is much less than that of a fullerence of equivalent diameter, and thus the carbon-carbon bonds in the sidewall of a carbon nanotube are much less reactive in general than those in the end caps. Based on their differences in chemical reactivity, the end caps and the sidewall of a carbon nanotube can be selectively derivatized. Recently, carboxylic acid groups have been introduced selectively either at the end caps or the side wall using different chemistries. When SWNTs are treated with an oxidation acid such as nitric acid ($HNO_3$), the carboxylic acid groups are introduced nearly exclusively at the end caps. When carbon nanotubes are derivatized using radical chemistry, the carboxylic acid group are exclusively introduced on the sidewall. For example, the reactions of SWNTs with succinic or glutaric acid acyl peroxides under radical chemistry conditions resulted in the addition of 2-carboxyethyl or 3-carboxypropyl groups, respectively, to the sidewall of the SWNT (Peng, et al., *J. Am. Chem. Soc.*, 2003, 125(49):15174-15182).

Carbon nanotubes are commercially available from a variety of sources. Single-walled carbon nanotubes can be obtained from Carbolex, MER Corporation (Tucson, Ariz.), and Carbon Nanotechnologies Incorporation ("CNI", Houston, Tex.). Multi-walled carbon nanotubes can be obtained from MER Corporation (Tucson, Ariz.) and Helix Material Solution (Richardson, Tex.). However, the present invention is not limited by the source of carbon nanotubes. In addition, many publications are available with sufficient information to allow one to manufacture nanotubes with desired structures and properties.

In certain embodiments of the present invention, the carbon nanotube is substantially a single-walled nanotube (SWNT), with a carbon content of no less than 60%, no less than 80%, no less than 90%, no less than 95%, no less than 98%, or no less than 99% by weight, and a purity of no less than 60%, no less than 80%, no less than 90%, no less than 95%, no less than 98%, or no less than 99% by weight. In an exemplary embodiment, the carbon nanotube has a diameter of from about 0.2 nm to about 100 nm, from about 0.4 nm to about 80 nm, from about 0.5 nm to about 60 nm, or from about 0.5 nm to 50 nm; a length of no greater than about 200 micrometers, no greater than 100 micrometers, no greater than about 50 micrometers, or no greater than 20 micrometers; an aspect ratio of no greater than 1,000,000, no greater than 100,000, no greater than 10,000, no greater than 1,000, no greater than 500, no greater than 200, or no greater than 100.

In certain embodiments, the carbon nanotube is substantially a double-walled nanotube, with a carbon content, purity, diameter, length, and aspect ratio, as described above. In certain embodiments, the carbon nanotube is substantially a multi-walled nanotube, with a carbon content, purity, diameter, length, and aspect ratio, as described above.

Metal Content of SWNTs

Carbon nanotubes used in the present invention can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Such molecules include alloys of these elements such as alloys of Cobalt with S, Br, Pb, Pt, Y, Cu, B, and Mg, and compounds such as the carbides (i.e. TiC, MoC, etc.). Accordingly, the carbon nanotubes may be prepared by methods known to introduce metals and their alloys into the interior of the carbon nanotubes.

Of particular interest in the practice of the present invention are carbon nanotubes that have been filled with metals such as copper, silver, lead, or nickel. Such filling can be accomplished, for example, by any known method. For example, methods are know to fill carbon nanotubes with Ni, Co, Fe, Pb, Ag and Cu. As discussed below, the metal serves as a catalyst in reacting with hydrazoic acid.

In addition, some of the most common techniques to produce carbon nanotubes are arc discharge, laser ablation, chemical vapor deposition, and flame synthesis. In general, the chemical vapor deposition has shown the most promise in being able to produce larger quantities of nanotubes at lower cost. This process is usually done by reacting a carbon-containing gas, such as acetylene, ethylene, ethanol, etc., with a metal catalyst particle, such as cobalt, nickel, or ion, at temperatures above 600° C. Using such methods, the resultant carbon nanotubes have associated therewith residual metal catalysts, which may by itself be sufficient to produce the activated SWNTs of the present invention.

Other methods are known to those of skill in the art to prepare metal-containing carbon nanotubes.

Reaction of Metal-Containing SWNTs with Hydrazide to Introduce Azide Groups

The metal-containing SWNTs can be reacted with hydrazoic acid under any safe conditions, such as the methods described in detail in the examples that follow. Either hydrazoic acid, gas or liquid, is useful in the practice of the present invention. The reaction should be under conditions that are sufficient to introduce stable azide groups into the SWNTs that cannot be easily removed under nonstringent conditions, such as agitation, moderate changes in pH, etc.

Uses of Activated SWNTs

The Activated SWNTs described herein are primarily useful in the preparation of protected primary explosives, such that they are "protected" by virtue of their strong carbon shells from unwanted or accidental initiation while at the same time can function well as initiators when the appropriate stimulus is supplied.

Examples

Actual

Experimental results are described in detail below with reference to the Figures, wherein like elements are referenced with like numerals throughout. The Figures are not necessarily drawn to scale and do not necessarily show every detail or structure of the various embodiments of the invention, but rather illustrate exemplary embodiments in order to provide a description of such embodiments.

Materials and Equipment a. Hydrazoic Acid

Hydrazoic acid was prepared by heating a mixture of sodium azide with excess stearic acid at above 80° C. The preferred temperature was 130-140° C. The sodium azide (99.5% purity) and the stearic acid (95% purity) were purchased from Sigma Aldrich (St. Louis, Mo.).

b. SWNTs

Purified HiPco SWNTs and Super Purified HiPco SWNTs were purchased from Carbon Nanotechnologies Incorporated (CNI, Houston, Tex.) and AP-Grade Carbon Nanotubes were purchased from Carbolex Inc (Lexington Ky.). The commercial SWNTs were used as received without further purification.

c. Iron Oxide

The iron(III) oxide nanopowder (5-25 nm) was purchased from Sigma Aldrich.

d. Infrared Spectrometry

Infrared spectra were obtained with a Nicolet Avatar 370 FT-IR spectrometer equipped with a deuterated triglycine sulfate (DTGS) detector. The IR data were collected in attenuated total reflectance (ATR) mode using a Smart Omni Sampler ATR accessory fitted with a germanium crystal. The spectra were composed of 32 co-added sample scans of 4 $cm^{-1}$ resolution in the range of 675-4000 $cm^{-1}$ and were ratioed against 32 co-added background scans.

e. Raman Spectroscopy

Raman spectra were acquired using samples in the solid state in the backscattering mode on the microstage of a Horiba Jobin Yvon LabRm spectrometer. Spectra were recorded over the range of 100-3500 $cm^{-1}$ and an excitation wavelength of 632.8 nm.

Preparation of Hydrazoic Acid $HN_3$ was generated by heating a mixture of stearic acid and sodium azide to 130-140° C.

Preparation of Hydrazoic Acid Activated SWNTs

The SWNTs were generally located about 12 inches above the $HN_3$ generating flask. When the $HN_3$ gas reached the SWNTs, through a nitrogen gas carrier or by diffusion, the temperature at contact was room temperature or slightly higher. Excess amount of starting materials (i.e. $NaN_3$ and stearic acid) were used to generate a continuous supply of $HN_3$ for a longer contact time between the $HN_3$ and the SWNTs.

a. SWNTs on Glass Wool exposed to Gaseous $HN_3$

A 250 ml three neck flask was equipped on the side necks with a nitrogen gas inlet with a valve, and a stopper. The middle neck was equipped with an adapter containing about one inch of a drying reagent (Drierite® brand calcium sulfate, W. A. Hammond Drierite Co. Ltd., Xenia, Ohio). This adapter was connected to a custom-made 50 ml round bottom flask with a male joint opening in the bottom and a regular female joint opening on top. A thin layer of glass wool was spread across the interior of the flask. The SWNTs were randomly deposited on the glass wool for maximum surface area exposure to $HN_3$ gas. The top of the flask was also equipped with an adapter containing about one inch of Drierite® calcium sulfate. The adapter was connected to a KOH solution as a scrubber for the unreacted $HN_3$ gas. After several reactions, the KOH scrubber solution was treated with ceric ammonium nitrate to neutralize the azide. The whole system was set up behind an explosion proof shield in a well-ventilated hood.

In a reaction the 250 ml round bottom flask was charged with a magnetic stirrer, 1 gram (15.4 mmol) of sodium azide and 5.5 grams (19.3 mmol) of stearic acid. About 20 mg (1.7 mmol, assuming all is carbon) of SWNT was distributed on the glass wool inside the 50 ml custom-made flask. A very slow flow of nitrogen gas was introduced into the 250 ml three neck flask. The 250 ml three neck flask was slowly heated by an oil bath to 130-140° C. This generated a slow release of $HN_3$ gas. The joints were tested for gas leaks by holding wet litmus papers next to them. Any $HN_3$ leak would change the color of the wet litmus paper to the corresponding acidic color. No grease was applied to the joints to avoid the possibility of reacting with the $HN_3$ and detonating while the joints were turned. After about two hours at 130-140° C. the nitrogen flow was stopped and the nitrogen valve was closed to let the HN₃ gas slowly pass through the system and into the scrubbing solution. The gas generating flask was heated at 130-140° C. for 36-48 hours. During this period the hood was closed with absolutely no other work performed in it, since the HN₃ gas is very explosive and is reported to undergo self-ignition (Dennis, I. M. et al., *J. Am. Chem. Soc.*, 29(2): 216-223 (1907)). After 36-48 hours, the oil bath was removed and the nitrogen valve was opened to flush the system. The SWNT product was then removed and collected from the glass wool by gentle tapping.

b. SWNTS in PTFE Tubing Exposed to Gaseous HN₃

The same set up as above was used except that the 50 ml flask with glass wool was replaced with a ¼" polytetrafluoroethylene (PTFE) tube that was packed loosely with the SWNTs.

c. SWNTs Suspended in Aqueous HN₃

To generate aqueous HN₃, the gas generator effluent was passed through water prior to sending it to the KOH scrubber solution. The aqueous HN₃ so obtained was very dilute (about 0.003M). In a typical reaction, about 10 mg SWNT was stirred in 100 ml aqueous HN₃ solution for two days. The SWNT was collected on filter paper, washed with copious amount of water and air dried.

Results

FIG. 1 shows the normalized IR spectra of SWNTs at 25° C. following increasing exposures to HN₃ vapor. For graphic simplicity, the full spectra are shown only for the unreacted SWNT and the product from the final exposure of SWNT to hydrazoic acid. The spectra display an increasing intensity at 2093 cm$^{-1}$ following increasing exposure times. This absorption mode is consistent with the asymmetric vibration of an azide (Lambert, J. B. et al., *Organic Structural Spectroscopy*, Prentice Hall Inc., pg. 197 (1998)). When the first exposure of SWNT from Carbolex Inc. to the HN₃ gas was concluded, the resulting IR spectrum (FIG. 1b) indicates a noticeable change in intensity at about 2093 cm$^{-1}$. The same sample was repeatedly treated with HN₃ gas generated from equal-sized batches of sodium azide and stearic acid. The feature at 2093 cm$^{-1}$ increased in intensity consistently with each increment of exposure.

Figure 2:
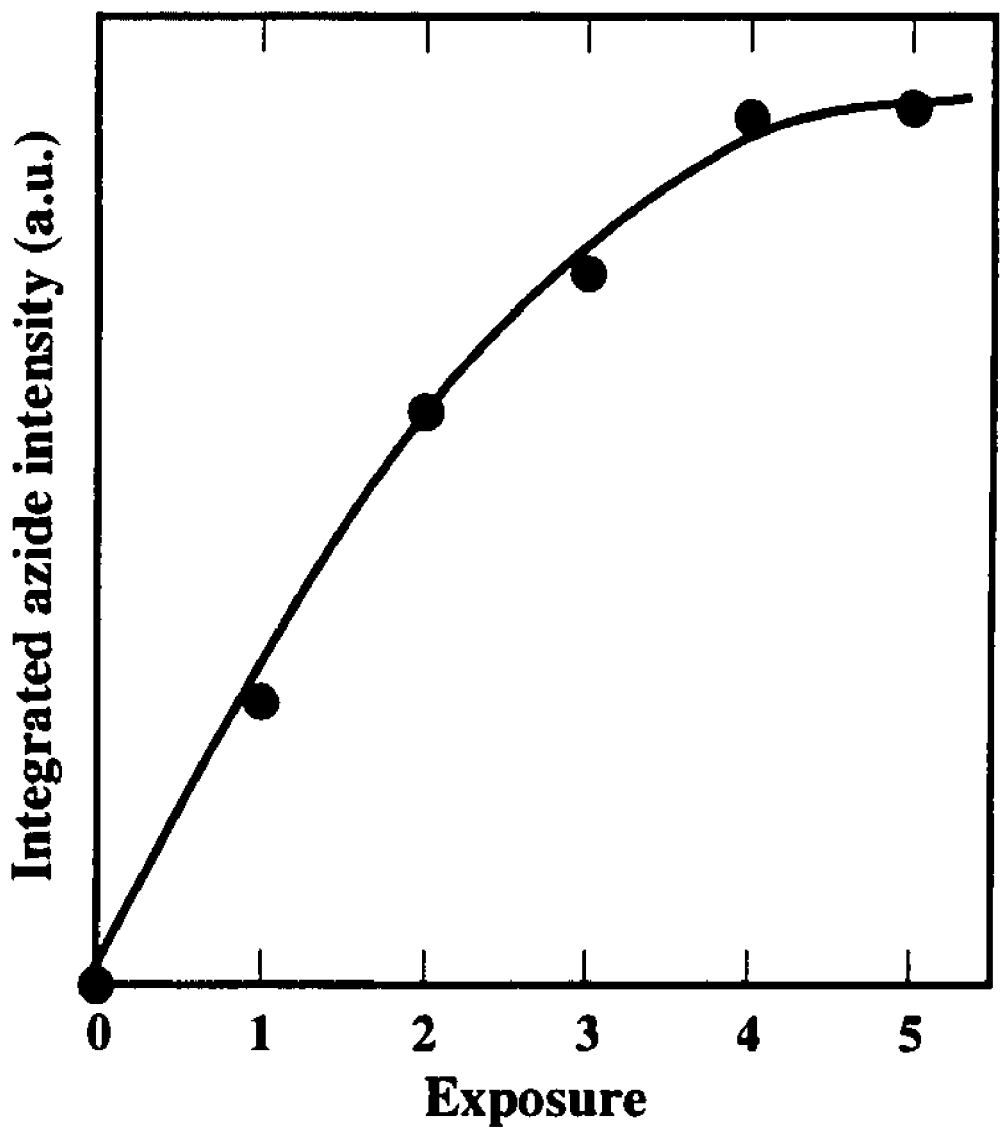
FIG. 2 shows the integrated intensities of the azide region (2000-2150 $cm^{-1}$) versus number of exposures.

After the fourth exposure, however, integrated azide peak intensities reached a plateau (FIG. 2). The Carbolex SWNTs as a loosely packed material in ¼" PTFE tubing (procedure b) with HN₃/N₂ gas generated products with the same IR spectrum as those made according to procedure a. However, procedure a does not involve the hazard in removing a compacted mass of azide-containing material from a tube. Procedure a also provides more surface area for contact of SWNTs with HN₃ gas.

A third way that Carbolex SWNTs were treated with HN₃ was stirring the SWNTs in aqueous HN₃ solution (according procedure c) for two days. The HN₃ solution was very dilute (about 0.003M). However, the IR spectrum of the product showed a similar absorption at ~2090 cm$^{-1}$ as is obtained from reaction of the SWNTs with gaseous HN₃ according to procedure a.

Incorporation of Azide into SWNTs

Although not wishing to be bound by any particular scientific theory, there are four possible ways that the azide could be incorporated into the SWNT: (a) HN₃ may diffuse into the nanotube, (b) the HN₃ may reside between layers of different nanotubes, (c) HN₃ may react with the defect sites of the SWNT to generate C—N₃ bonds, and (d) the HN₃ may react with the metal catalysts present in the SWNT.

Possibilities (a) and (b) were found to be less likely because when a sample of HN₃-treated SWNT was exposed to high vacuum (10$^{-8}$ torr) for seven days no change in the intensity of the azide absorption was observed. Also, when a sample of HN₃-treated SWNT was stirred in water, with or without sonication, no change in the pH value of the solution was measured (pH is 6.5), indicating that no HN₃ was released into the aqueous medium. In addition, IR absorptions associated with HN₃ molecule at 3336 cm$^{-1}$ (N—H), and 1150 cm$^{-1}$ (H—N—N) (Urbanski, T., *Chemistry and Technology of Explosives Volume III*, Pergamon Press, Ltd., pg. 164 (1967)) are missing. Furthermore, the fact that aqueous HN₃ reacts with SWNT to generate the same product rules out the possibility of entrapment of gaseous HN₃ inside the SWNTs.

Regarding possibility (c) which involves the reaction with defect sites, a perfectly produced SWNT resembles a cylindrical aromatic macromolecule with both ends closed and without any functional groups. Thus, they are ideally chemically inert. However, no such SWNT is perfect, and all have a certain degree of reactivity. For example, there may be a curvature-induced pyramidization and misalignment of the pi-orbitals of the carbon atoms that generate local strains and hence reactive sites. In fact, the end caps of the cylinder are always very reactive and can be opened up by aggressive oxidizers.

Figure 3:
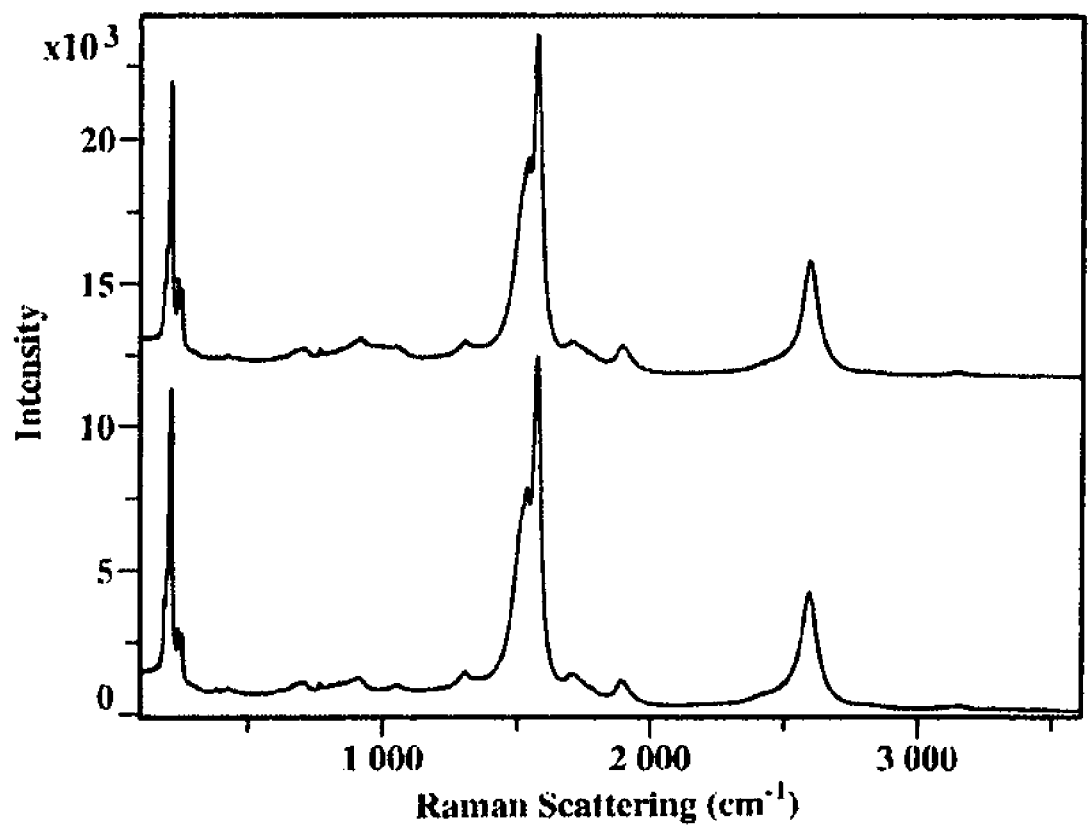
FIG. 3 shows the Raman spectra of SWNT from CNI (98% purity) before (top) and after (bottom) exposure to $HN_3$.

Possibility (c) was also found to be unlikely because a survey of the IR spectra of organic azides indicated that along with the azide absorption at about 2100 cm$^{-1}$ (asymmetric vibration) there is usually a complementary stretch at 1350-1180 cm$^{-1}$ (symmetric vibration) that is missing here. Lieber, E., *Anal. Chem.*, 29:916-918 (1957); Lieber, E. et al., *Anal. Chem.*, 23:1594-1604 (1951). Furthermore, the Raman spectroscopy data (FIG. 3) indicates that no functionalities have been introduced in SWNTs. Finally, as explained below, the azide absorption at about 2100 cm$^{-1}$ is proved to be directly related to the metals in SWNTs and not the carbon structures.

Figure 4:
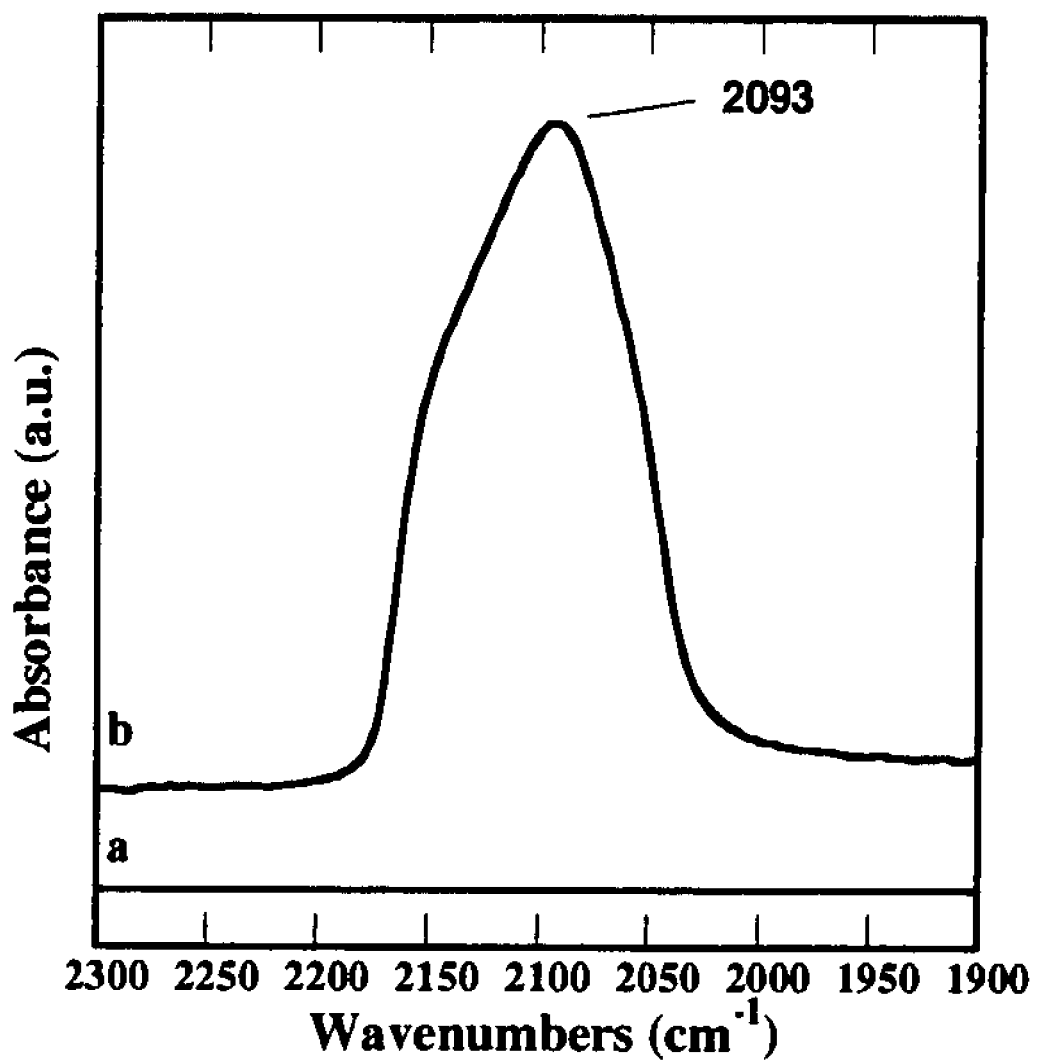
FIG. 4 shows the IR spectra of Nickel surface acquired a) prior to $HN_3$ exposure and b) after $HN_3$ exposure.

The metal content of the SWNT provided by Carbolex Inc. was nickel. Therefore, it is plausible that it was the nickel that reacted with gaseous HN₃ and generated nickel azide. Hence, a sample of elemental nickel was treated with HN₃ under the same conditions described in procedure a. The nickel azide product showed very similar IR absorption (see FIG. 4) as that of the HN₃-treated SWNT from Carbolex Inc.

Figure 5:
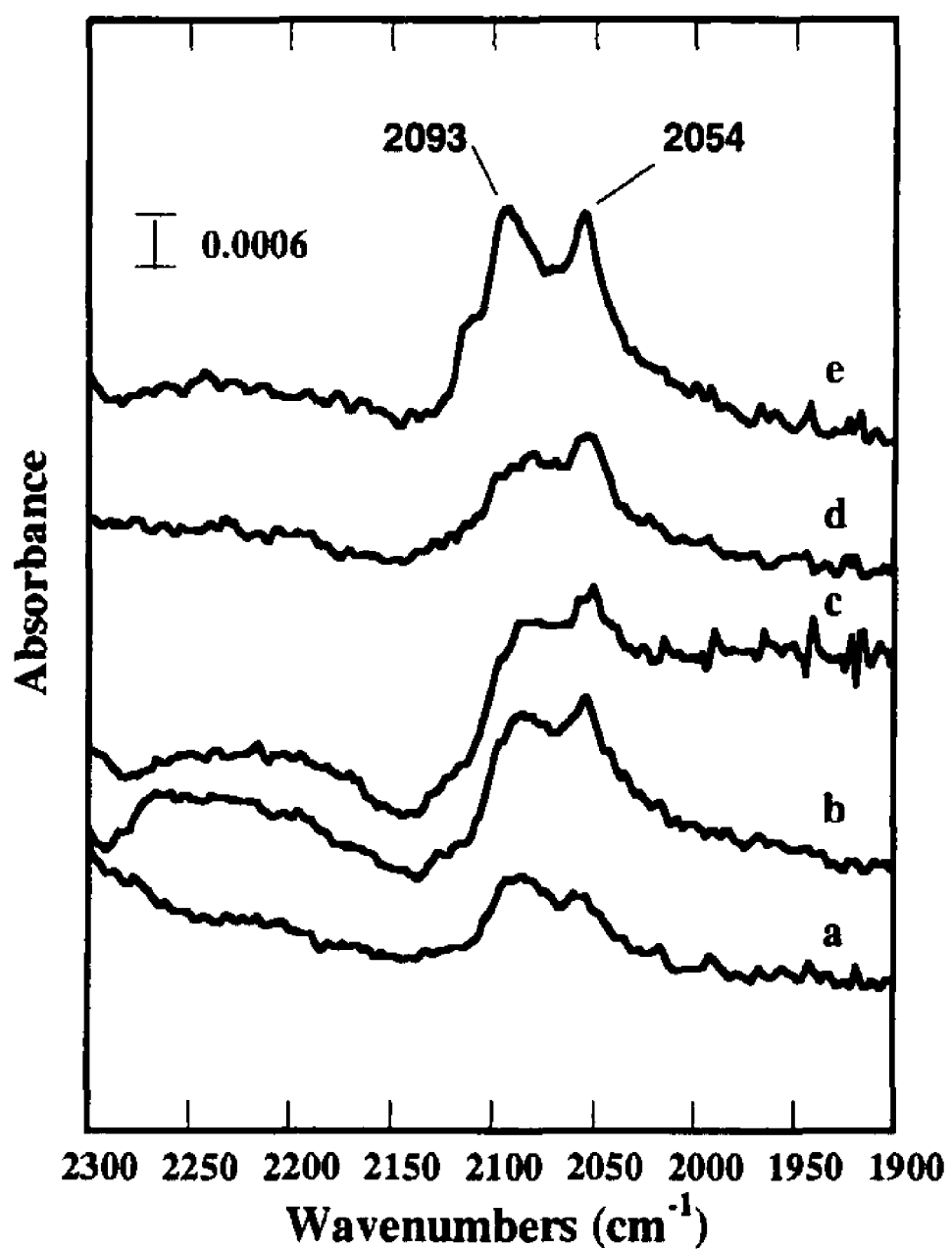
FIG. 5 shows IR absorption spectra of SWNTs acquired from Carbon Nanotechnologies Incorporated (92% purity) obtained from incremental $HN_3$ exposures: a) untreated SWNT; b) 1 exposure; c) 2 exposures; d) 3 exposures; and e) 4 exposures.

To further confirm the reaction of HN₃ with the metal content of the SWNTs, samples of SWNTs that contained a different metal were purchased from CNI, Inc. The SWNTs from CNI had iron oxide as the metal content. SWNTs with 92% purity from CNI were treated with HN₃ using procedure a. The product displayed IR stretches at about 2054 cm$^{-1}$ and 2093 cm$^{-1}$ (see FIG. 5). The reaction of HN₃ with higher purity SWNTs (98%-from CNI) also provided similar IR stretches but with significantly weaker intensities. In fact, after five series of HN₃ treatments the 92% purity SWNT showed considerable increase in the intensity of the IR stretches (see FIG. 5), whereas the 98% purity SWNT did not show any increase in intensity, presumably due to the lower iron oxide content.

Figure 6:
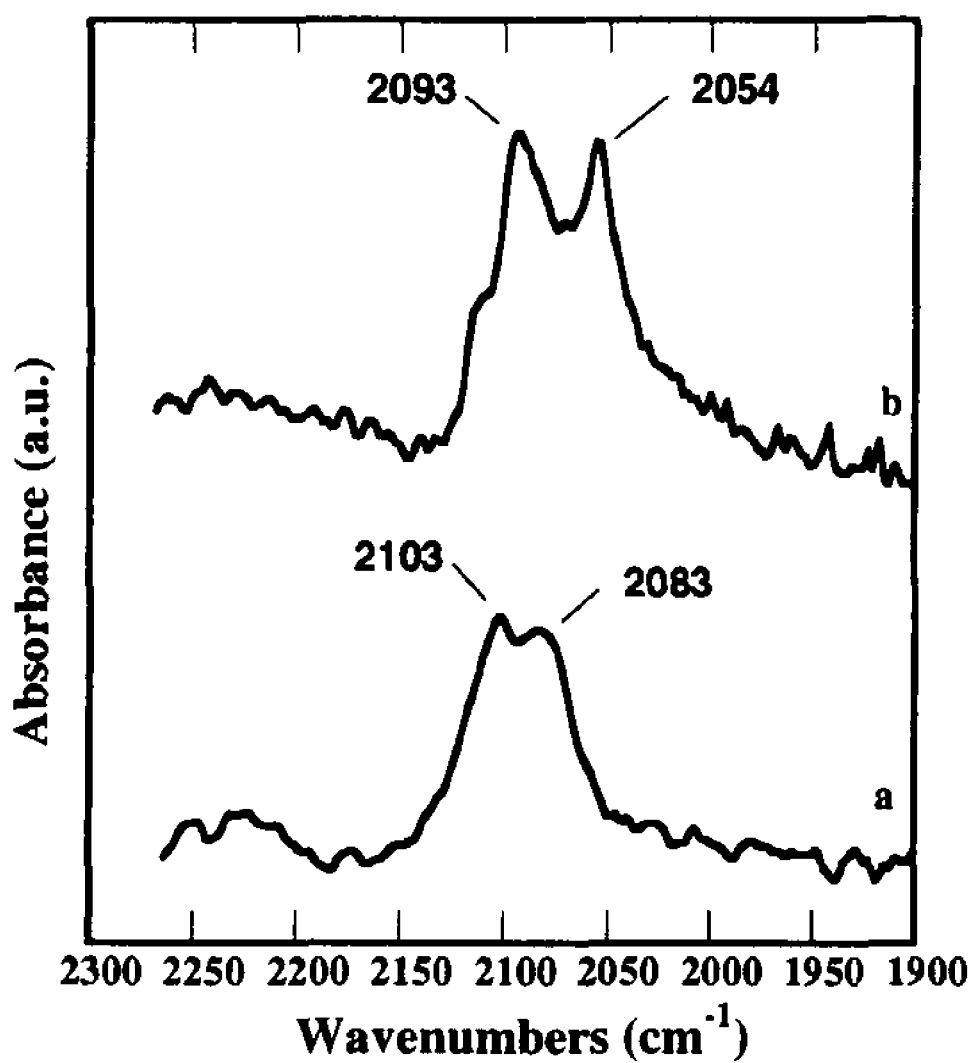
FIG. 6 shows the IR absorption spectra of iron oxide exposed to $HN_3$ and CNI 92% purity SWNTs exposed to $HN_3$.

In order to confirm that the azide absorptions were due to the reaction of HN₃ with iron in the SWNTs, samples of iron oxide nanopowders were also treated with HN₃ using procedure (a). The IR spectrum of the iron oxide powder exposed to hydrazoic acid (see FIG. 6a) shows modes at 2083 cm$^{-1}$ and 2103 cm$^{-1}$. Splitting of the azide peak upon adsorption was observed to be analogous to that observed for iron containing SWNT products (see FIG. 6b). Similar splittings in the 2000-2100 cm$^{-1}$ region of the IR spectra for Fe(III)-N₃ complexes have been observed 18. McCoy, S. et al., *Biochemistry*, 9:2387 (1970); Alben, J. O. et al., *Biochemistry*, 11:842 (1972); Maurus, R. et al., *Biochem J.*, 332:67 (1998). McCoy et al. assign bands at 2023 cm$^{-1}$ and 2046 cm$^{-1}$ for metymyoglobin azide [Fe(III) Mb-N$_3$] and at 2026 cm$^{-1}$ and 2048 cm$^{-1}$ for methemoglobin azide [Fe(III) Hb-N$_3$] to the antisymmetric stretch of bound azide. Lieber, E., *Anal. Chem.*, 29:916-918 (1957); Lieber, E. et al., *Anal. Chem.*, 23:1594-1604 (1951). The lower frequency modes were assigned to low-spin species and the high frequency modes to the high-spin states. Their results are in agreement with Alben et al. who further correlate the high-spin Fe(III) and low-spin Fe(III) in MbN$_3$ complexes as bound to ionic N$_3$— and covalent N$_3$—, respectively. McCoy, S. et al., *Biochemistry*, 9:2387 (1970).

The distinctly double absorption feature observed in the IR spectra for the iron containing SWNTs versus the single and broad absorption for the Ni containing SWNTs following HN$_3$ treatment provides an understanding of the chemisorption process. The difference in the spectra (i.e. splitting) indicates that the azide reacts with the metal present in the SWNT. Furthermore, the lower signal to noise ratio of FIG. 5 (SWNT of CNI) compared to FIG. 1 (SWNT of Carbolex) is an indication that there is less metal in the CNI samples resulting in less metal azide. Thus, the metal is actively contributing and plays an important role in the chemistry of SWNTs. Therefore, the assumption that the metals incorporated within SWNTs are covered with graphite and are unreactive (Ellison, M. D. et al., *J. Phys. Chem. B*, 108:7938-7943 (2004)) is not necessarily the case.

Raman spectroscopy is a sensitive tool for probing changes in SWNTs associated mainly with side-wall functionalization. The SWNTs exhibit three strong bands: a radial breathing mode at ~160 cm$^{-1}$, a tangential mode at ~1580 cm$^{-1}$ (G-band), and a second-order G'-band at ~2620 cm$^{-1}$. The low-frequency region around 160 cm$^{-1}$ is attributed to the radial breathing mode whose frequency depends on the tube diameters. The G-band for the pristine and hydrazoic acid reacted SWNT samples have double-peak structures typical for carbon nanotubes. The weak band centered at ~1320 cm$^{-1}$, the disorder mode (D-band), is attributed to sp$^3$-hybridized carbon in the hexagonal framework of the nanotube walls. The intensity of the D-band (1320 cm$^-$) can be divided by the intensity of the tangential mode (G-band) at 1580 cm$^{-1}$ and this ratio provides a good indication of the relative degree of functionalization. After the reaction of both the pristine CarboLex and CNI SWNT samples with hydrazoic acid the D/G line ratio remained constant. Side-wall derivatization of the SWNTs would have increased the ratio of D/G line intensities. This indicates that the tube bodies remained stable with respect to the performed chemical reactions with hydrazoic acid, and no new defects due to side-wall functionalization were formed.

Figure 7:
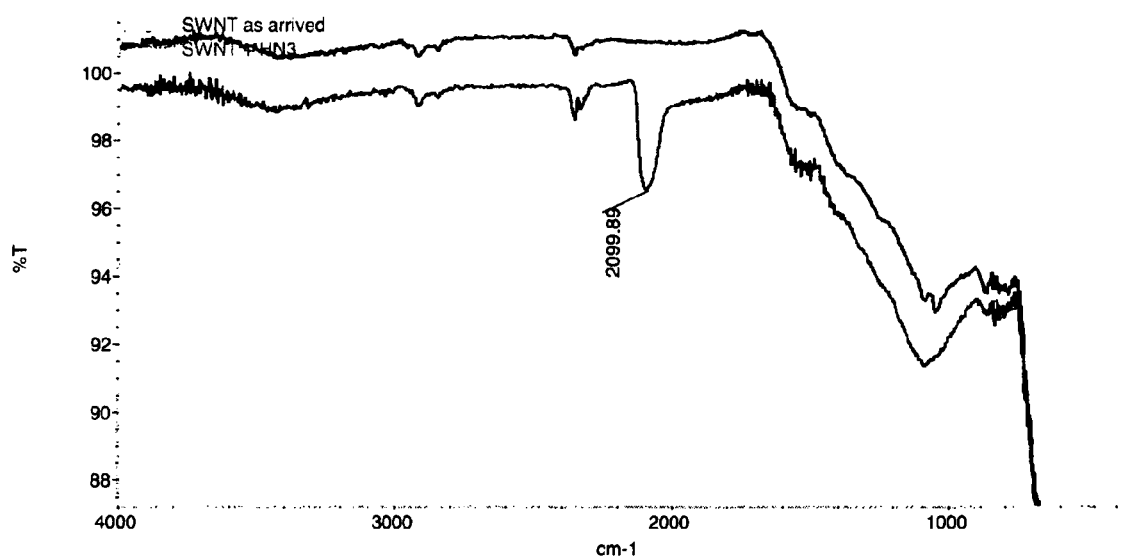
FIG. 7 shows the IR spectra of iron oxide filled carbon nanotubes before (top) and after (bottom) exposure to hydrazoic acid.

These experiments established that metals such as iron or nickel, which are inherently present in commercial SWNTs, or which can be introduced into the SWNTs, react with gaseous or aqueous hydrazoic acid and generate the corresponding metal azides. The carbon structure of the SWNTs seems to remain unaffected by HN$_3$ treatments at ambient conditions. As a result of this study it was concluded that the work can be expanded to generating energetic metal azides inside the carbon nanotubes. An article by Yury Gogotsi (*Nano Letters*, 5 (5): 879-884 (2005)) describes a simple and versatile technique to fill carbon nanotubes with iron oxide. When a sample of iron oxide-filled SWNT was exposed to hydrazoic acid, using the general procedure explained earlier, IR spectroscopy of the resulting product showed a stretch at about 2100 cm$^{-1}$ that confirms the formation of iron azide (FIG. 7). This experiment proves that if metals are placed inside the carbon nanotubes, they can be converted to the corresponding metal azides by exposing them to hydrazoic acid. Metals such as silver (*JACS*, 124: 2116 (2002); and *Chem. Commun.*, 8: 699-700 (1999)); copper (*Nano Lett.* 7: 58-63 (2007)); and lead (*Nature*, 361: 333 (1993)) have already been incorporated inside carbon nanotubes. Using the hydrazoic acid treatment of the present invention, it is feasible to obtain silver azide, copper azide, and lead azide encapsulated inside carbon nanotubes. By this procedure, a new class of energetic metal azides protected inside carbon nanotubes are obtained.

Various modifications and alterations of the invention will become apparent to those skilled in the art without departing from the spirit and scope of the invention, which is defined by the accompanying claims. It should be noted that steps recited in any method claims below do not necessarily need to be performed in the order they are recited. For example, in certain embodiments, steps may be performed simultaneously. Additionally, any element in a claim that does not explicitly state "means for" performing a specified function or "step for" performing a specified function is not to be interpreted as a "means" or "step" clause as specified in 35 U.S.C. §112, ¶6. The accompanying claims should be constructed with these principles in mind.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A method of making an activated single walled carbon nanotube (SWNT) having a tubular single wall and a plurality of metal azides inside the tubular single wall, comprising:
   providing the SWNTs, wherein the SWNTs further comprise at least one metal inside the tubular single wall; and
   reacting the SWNTs with hydrazoic acid for addition to the SWNTs to form metal azides inside the tubular single wall, wherein the hydrazoic acid is in a gaseous state.

2. The method according to claim 1, wherein the metal is selected from the group consisting of, lead, nickel, and silver.

3. The method according to claim 1, further comprising forming hydrazoic acid by heating a mixture of sodium azide with excess stearic acid.

4. The method according to claim 1, wherein said providing the SWNTs is selected from one of providing the SWNTs on glass wool, providing the SWNTS in polytetrafluoroethylene (PTFE) tubing, and providing the SWNTS in a liquid suspension.

* * * * *